(12) United States Patent
Abbas et al.

(10) Patent No.: US 11,175,171 B2
(45) Date of Patent: Nov. 16, 2021

(54) FUEL LEVEL DISPLAY FILTER ALGORITHM ADJUST TO PREVENT FUEL RUN OUT WITH FUEL DISPLAYED ON GAUGE

(71) Applicant: GM Global Technology Operations LLC, Detroit, MI (US)

(72) Inventors: Ayman A. Abbas, Alexandria, VA (US);
Michael V. Miceli, Fenton, MI (US);
Thomas J. McDade, Jr., Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 16/149,191

(22) Filed: Oct. 2, 2018

(65) Prior Publication Data

US 2020/0103267 A1    Apr. 2, 2020

(51) Int. Cl.
*G01F 23/00*     (2006.01)
*B60R 16/023*   (2006.01)
(Continued)

(52) U.S. Cl.
CPC ...... *G01F 23/0076* (2013.01); *B60R 16/0236* (2013.01); *B60K 2015/03434* (2013.01);
(Continued)

(58) Field of Classification Search
None
See application file for complete search history.

(56) References Cited

U.S. PATENT DOCUMENTS 5,899,192 A * 5/1999 Tsutsumi ............ F02D 41/0235
                                                        123/492
6,253,607 B1 * 7/2001 Dau ....................... G01D 3/032
                                                        73/290 R
(Continued)

FOREIGN PATENT DOCUMENTS

CN    101988408 A    3/2011
CN    104145096 A   11/2014
(Continued)

OTHER PUBLICATIONS

Espacenet machine translation, KR20110116544A, Ham Heung Sik, Sensing Signal of Fuel Gage Sensor Diagnosis Apparatus and Sensing Signal of Fuel Gage Sensor Diagnosis Method, Oct. 26, 2011, (Year: 2020).*

(Continued)

*Primary Examiner* — Eman A Alkafawi
*Assistant Examiner* — Denise R Karavias
(74) *Attorney, Agent, or Firm* — Quinn IP Law (57) ABSTRACT

A method is used to control a fuel level gauge of a vehicle system and includes: monitoring, via an engine controller, a fuel economy of the vehicle system; comparing, via the engine controller, the fuel economy with a predetermined fuel economy threshold to determine whether the fuel economy is less than the predetermined fuel economy threshold; adjusting, via the engine controller, a sensitivity of a display filter in response to determining that the fuel economy is less than the predetermined fuel economy threshold for a predetermined amount of time in order to maximize an accuracy of the fuel level gauge, wherein the display filter smoothes an unfiltered fuel level signal received from a fuel level sensor of the vehicle system, thereby generating a filtered fuel level signal; and control-
(Continued)

ling, via an instrument panel controller, the fuel level gauge of the vehicle system.

16 Claims, 3 Drawing Sheets

(51) Int. Cl.
 *B60W 40/10* (2012.01)
 *G01F 9/02* (2006.01)
 *B60W 50/14* (2020.01)
 *B60K 15/03* (2006.01)
(52) U.S. Cl.
 CPC ........ *B60K 2370/174* (2019.05); *B60W 40/10* (2013.01); *B60W 50/14* (2013.01); *G01F 9/023* (2013.01)

(56) References Cited

U.S. PATENT DOCUMENTS

| | | | |
|---|---|---|---|
| 2005/0062593 A1* | 3/2005 | Taxon | G01F 9/001 340/450.2 |
| 2011/0016848 A1 | 1/2011 | Brooks | |
| 2011/0023461 A1 | 2/2011 | Strots et al. | |
| 2012/0245837 A1* | 9/2012 | Lee | G07C 5/085 701/123 |
| 2013/0197777 A1* | 8/2013 | Sloan | B60K 15/03006 701/102 |
| 2017/0336239 A1* | 11/2017 | Collins | G01F 23/0076 |
| 2018/0010503 A1 | 1/2018 | Van Niekerk et al. | |
| 2018/0306629 A1* | 10/2018 | Kobayashi | G01F 23/0061 |
| 2020/0079223 A1* | 3/2020 | Puri | B60L 58/10 |

FOREIGN PATENT DOCUMENTS

| | | |
|---|---|---|
| DE | 102016213612 B3 | 12/2017 |
| JP | H09158715 A | 6/1997 |

OTHER PUBLICATIONS

Expacenet, machine translation, Ham Heung Sik, "Sensing Signal of Fuel Gage Sensor Diagnosis Apparatus and Sensing Signal of Fuel Gage Sensor Diagnosis Method," KR20110116544A, Oct. 26, 2011 (Year: 2011).*

Espacenet machine translation, Ito Kengo, Vehicle Residual Fuel Display Device, JP2015193363A, Nov. 5, 2015 (Year: 2015).*

* cited by examiner

FUEL LEVEL DISPLAY FILTER ALGORITHM ADJUST TO PREVENT FUEL RUN OUT WITH FUEL DISPLAYED ON GAUGE

INTRODUCTION

The present disclosure relates to a fuel level display algorithm that minimizes the risk of fuel running out in a vehicle while the fuel gauge displays that fuel is still available in the fuel tank of the vehicle.

Certain vehicles include a fuel tank capable of holding fuel, such as gasoline. The fuel is supplied, for example, to an internal combustion engine. The internal combustion engine combusts the fuel to propel the vehicle. Therefore, the internal combustion engine requires a continuous supply of fuel to propel the vehicle.

SUMMARY

The present disclosure describes an algorithm which monitors the fuel economy of the engine and which, when that economy drops below a calibrated level for a calibrated time, with hysteresis, will adjust the display filter sensitivity, display filter lag and low fuel warning threshold. This algorithm will allow the low fuel warning lamp to come on sooner than the existing state of the art in order to give the driver more time to find a refuel station based on current engine fuel consumption.

Existing fuel level display algorithms filter the display so that the needle on the gauge does not move around as fuel sloshes around in the tank, e.g. during braking and cornering of the vehicle. These filters are "heavy" in order to show as little motion due to sloshing as possible. The nature of a heavy lag filter (or first order filter) is that there is a time delay or lag, between the real level of fuel in the tank and the displayed level. This delay, coupled with a smaller tank and an engine that is less efficient than normal due to heavy load (e.g., pulling a trailer) may lead to the fuel level becoming very low before the gauge indicates that fuel is about to run out. The presently disclosed algorithm will constantly monitor the fuel economy and dynamically adjust the filter, lag and warning threshold in order to give the proper advanced warning of fuel run out.

Specifically, the present disclosure describes a method for controlling a fuel level gauge of a vehicle system. In some aspects of the present disclosure, the method includes: monitoring, via an engine controller, a fuel economy of the vehicle system; comparing, via the engine controller, the fuel economy with a predetermined fuel economy threshold to determine whether the fuel economy is less than the predetermined fuel economy threshold; adjusting, via the engine controller, a sensitivity of a display filter in response to determining that the fuel economy is less than the predetermined fuel economy threshold for a predetermined amount of time in order to maximize an accuracy of the fuel level gauge, wherein the display filter smoothes an unfiltered fuel level signal received from a fuel level sensor of the vehicle system, thereby generating a filtered fuel level signal; and controlling, via an instrument panel controller, the fuel level gauge of the vehicle system to display a fuel level of the vehicle system corresponding to the filtered fuel level signal after adjusting the sensitivity of the display filter.

Adjusting the sensitivity of the display filter includes decreasing the sensitivity of the display filter from a first sensitivity to a second sensitivity. The second sensitivity is less than the first sensitivity. The method further includes removing, via the engine controller, a lag from the display filter in response to determining that the fuel economy is less than the predetermined fuel economy threshold for the predetermined amount of time to minimize a temporal delay between the unfiltered fuel level signal and the filtered fuel level signal.

The method further includes adjusting, via the engine controller, a low-fuel warning threshold in response to determining that the fuel economy is less than the predetermined fuel economy threshold. The instrument panel controller is programmed to activate a low-fuel warning indicator in response to determining that the fuel level of the vehicle system is equal to or less than the low-fuel warning threshold. Adjusting the low-fuel warning threshold includes changing the low-fuel warning threshold from a first warning threshold to a second warning threshold, and the second warning threshold is greater than the first warning threshold.

In this method, monitoring the fuel economy of the vehicle system includes: monitoring a distance traveled by the vehicle system; monitoring a fuel quantity consumed by the vehicle system; and dividing the distance traveled by the vehicle system by the fuel quantity consumed by the vehicle system to continuously determine the fuel economy of the vehicle system.

The engine controller receives the unfiltered fuel level signal from the fuel level sensor, the engine controller is programmed with the display filter to filter the unfiltered fuel level signal and generate a normal filtered fuel level signal. The normal filtered fuel level signal is indicative of a normal filtered fuel level value.

The method further includes comparing the normal filtered fuel level value with a first predetermined fuel level threshold to determine whether the normal filtered fuel level value is greater than the first predetermined fuel level threshold. Comparing the fuel economy of the vehicle system with the predetermined fuel economy threshold occurs in response to determining that the normal filtered fuel level value is greater than the first predetermined fuel level threshold.

The method further includes: starting a timer in response to determining that the fuel economy of the vehicle system is less than the predetermined fuel economy threshold to measure an amount of time that has lapsed since the fuel economy of the vehicle system is less than the predetermined fuel economy threshold; after starting the timer, comparing the amount of time that has lapsed since the fuel economy of the vehicle system is less than the predetermined fuel economy threshold with the predetermined amount of time to determine whether the amount of time that has lapsed since the fuel economy of the vehicle system is less than the predetermined fuel economy threshold with the predetermined amount of time is greater than the predetermined amount of time; determining that the vehicle system is operating in a heavy fuel consumption mode in response to determining that the fuel economy is less than the predetermined fuel economy threshold for the predetermined amount of time; setting a remove lag flag to FALSE. Removing the lag from the display filter occurs by reinitializing the display filter in response to setting the remove lag flag to FALSE.

Adjusting the sensitivity of the display filter based on the fuel economy occurs after removing the lag from the display filter. Adjusting the low-fuel warning threshold occurs after adjusting the sensitivity of the display filter.

The present disclosure also describes a vehicle system. The vehicle system includes an internal combustion engine, an engine controller in communication with the internal combustion engine, a fuel tank in fluid communication with the internal combustion engine, a fuel level sensor configured to measure and monitor a fuel level inside the fuel tank, an instrument panel controller in communication with the engine controller; and an instrument panel in communication with the instrument panel controller, wherein the instrument panel includes a fuel level gauge.

The engine controller is programmed to: monitor a fuel economy of the vehicle system; compare the fuel economy with a predetermined fuel economy threshold to determine whether the fuel economy is less than the predetermined fuel economy threshold; and adjust a sensitivity of a display filter based on the fuel economy in response to determining that the fuel economy is less than the predetermined fuel economy threshold for a predetermined amount of time in order to maximize an accuracy of the fuel level gauge. The display filter smoothes a fuel level signal received from a fuel level sensor of the vehicle system, thereby generating a filtered fuel level signal. The instrument panel controller is programmed to control the fuel level gauge of the vehicle system to display a fuel level of the vehicle system corresponding to the filtered fuel level signal after adjusting the sensitivity of the display filter.

The engine controller is further programmed to remove a lag from the display filter in response to determining that the fuel economy is less than the predetermined fuel economy threshold for the predetermined amount of time to minimize a temporal delay between the fuel level signal and the filtered fuel level signal. The engine controller is further programmed to adjust a low-fuel warning threshold in response to determining that the fuel economy is less than the predetermined fuel economy threshold, wherein the instrument panel controller is programmed to activate a low-fuel warning indicator in response to determining that the fuel level of the vehicle system is equal to or less than the low-fuel warning threshold.

The engine controller monitors the fuel economy of the vehicle system by: monitoring a distance traveled by the vehicle system; monitoring a fuel quantity consumed by the vehicle system; and dividing the distance traveled by the vehicle system by the fuel quantity consumed by the vehicle system to continuously determine the fuel economy of the vehicle system.

The engine controller receives the fuel level signal from the fuel level sensor, the engine controller is programmed with the display filter to filter the fuel level signal and generate a normal filtered fuel level signal, and the normal filtered fuel level signal is indicative of a normal filtered fuel level value.

The engine controller is further programmed to compare the normal filtered fuel level value with a first predetermined fuel level threshold to determine whether the normal filtered fuel level value is greater than the first predetermined fuel level threshold. Comparing the fuel economy of the vehicle system with the predetermined fuel economy threshold occurs in response to determining that the normal filtered fuel level value is greater than the first predetermined fuel level threshold.

The engine controller is further programmed to: start a timer in response to determining that the fuel economy of the vehicle system is less than the predetermined fuel economy threshold to measure an amount of time that has lapsed since the fuel economy of the vehicle system is less than the predetermined fuel economy threshold; after starting the timer; compare the amount of time that has lapsed since the fuel economy of the vehicle system is less than the predetermined fuel economy threshold with the predetermined amount of time to determine whether the amount of time that has lapsed since the fuel economy of the vehicle system is less than the predetermined fuel economy threshold is greater than the predetermined amount of time; determine that the vehicle system is operating in a heavy fuel consumption mode in response to determining that the fuel economy is less than the predetermined fuel economy threshold for the predetermined amount of time; and set a remove lag flag to FALSE. Removing the lag from the display filter occurs by reinitializing the display filter in response to setting the remove lag flag to FALSE.

The engine controller adjusts the sensitivity of the display filter based on the fuel economy after removing the lag from the display filter. The engine controller is programmed to adjust the low-fuel warning threshold after adjusting the sensitivity of the display filter.

The above features and advantages and other features and advantages of the present teachings are readily apparent from the following detailed description of the best modes for carrying out the teachings when taken in connection with the accompanying drawings.

DETAILED DESCRIPTION

Figure 1:
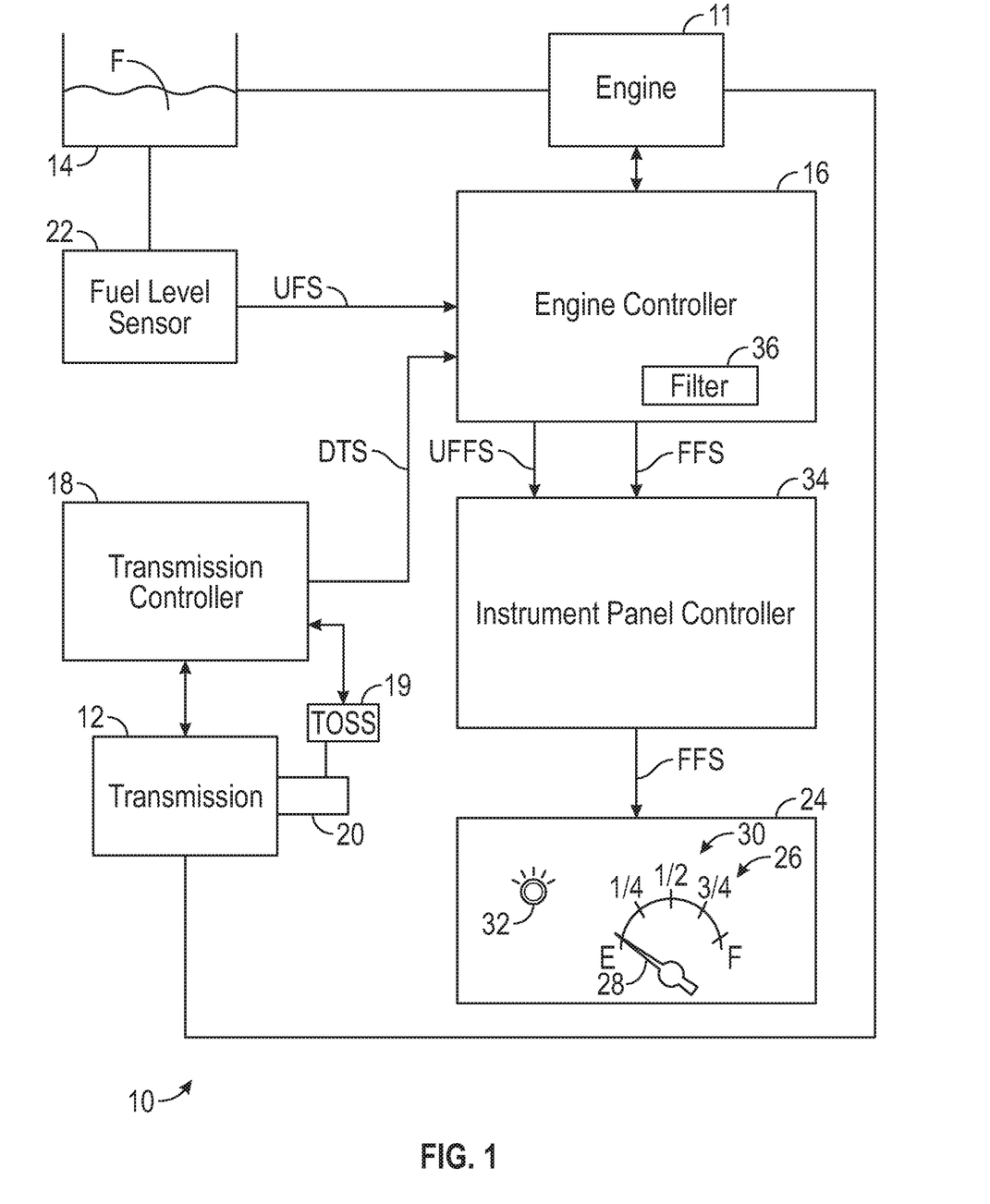
FIG. 1 is a schematic diagram of a vehicle system.

Referring to the drawings, wherein like reference numbers correspond to like or similar components throughout the several figures, and beginning with FIG. 1, a vehicle system 10 may be a car, a truck, agricultural equipment (or the like) and includes an internal combustion engine 11 and a transmission 12 mechanically coupled to the internal combustion engine 11. The internal combustion engine 11 is configured to combust fuel F to propel the vehicle system 10. To this end, the internal combustion engine 11 is in fluid communication with a fuel tank 14, which is configured to store the fuel F. Thus, fuel F in the fuel tank 14 is supplied to the internal combustion engine 11. Due to the combustion in the internal combustion engine 11, torque is transmitted from the internal combustion engine 11 to the transmission 12. The transmission 12 may include gear and gear trains to provide speed and torque conversion from the internal combustion engine 11 to the driveline of the vehicle system 10.

Figure 2A:
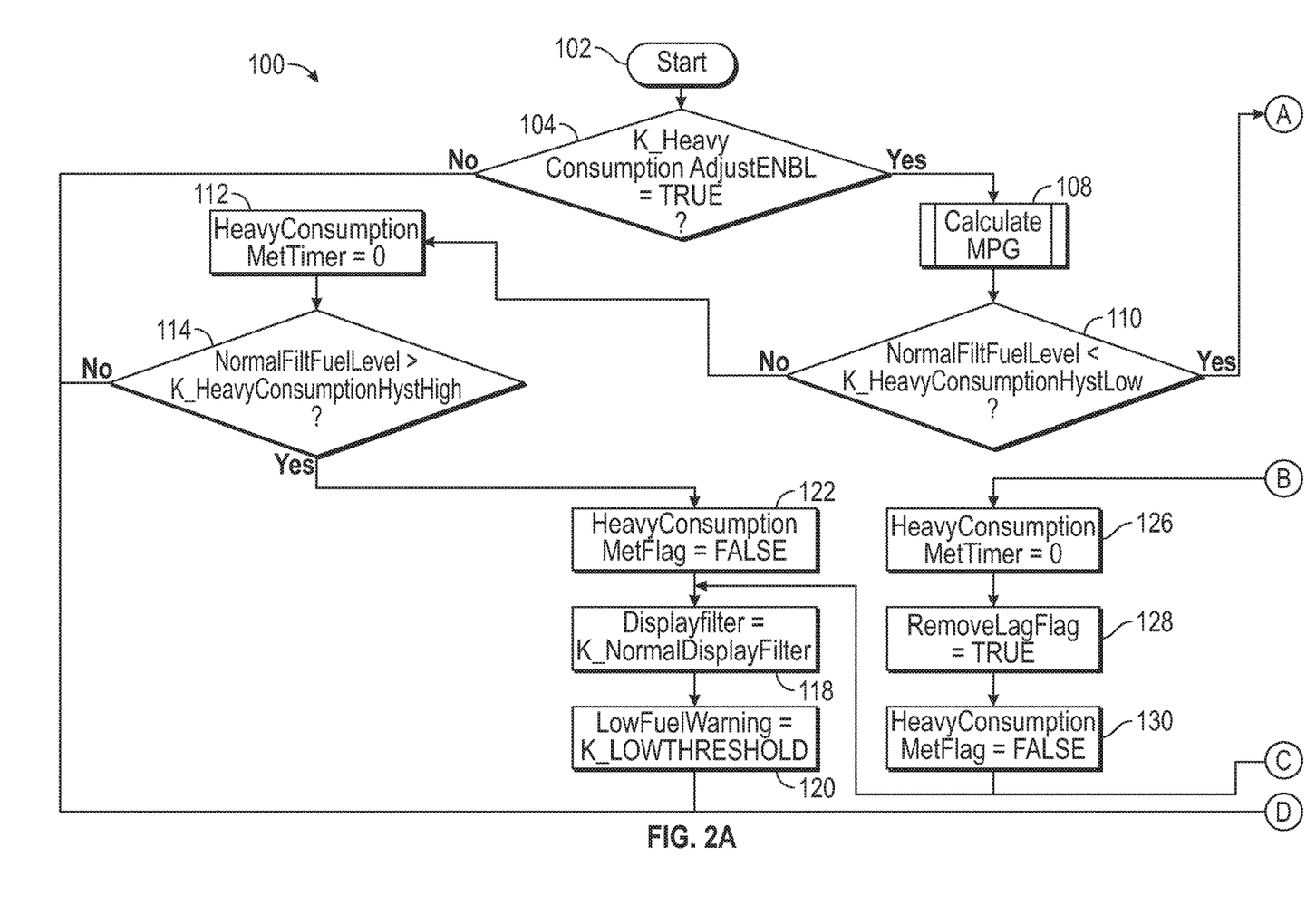
FIG. 2a is part of a flowchart of an algorithm for controlling a fuel display gauge of a vehicle system.
Figure 2B:
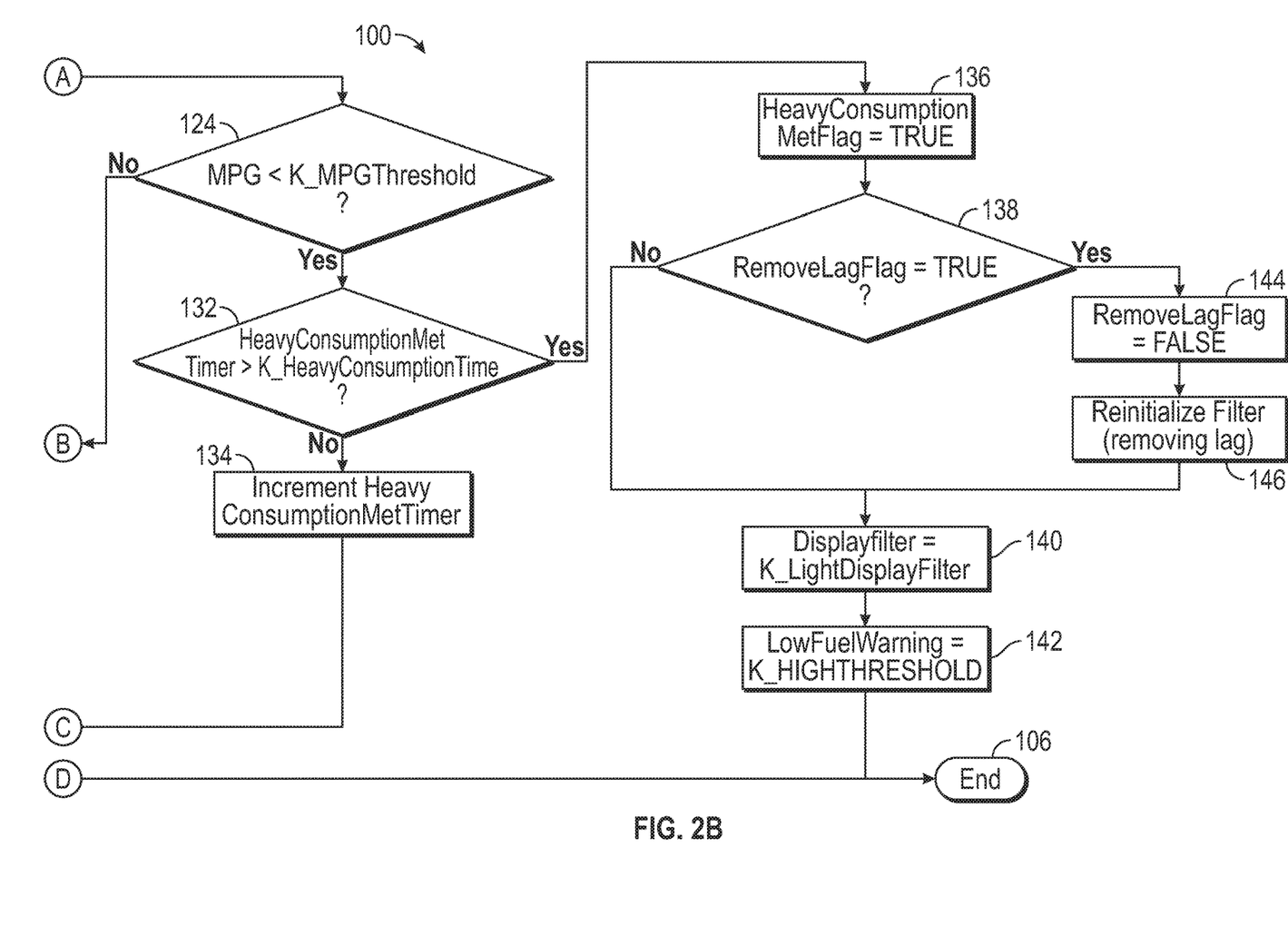
FIG. 2b is another part of the flowchart of the algorithm for controlling the fuel display gauge of a vehicle system.

The vehicle system 10 includes an engine controller 16 for controlling the operation of the internal combustion engine 11. The term "controller" means a physical device including hardware elements such as a processor (P), circuitry including but not limited to a timer, oscillator, analog-to-digital (A/D) circuitry, digital-to-analog (D/A) circuitry, a digital signal processor, and other input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random access memory (RAM), electrically-erasable programmable read-only memory (EEPROM), and the like. A method 100 (FIG. 2) may be recorded in memory (M) and executed by the processor (P) in the overall control of the engine 11. The engine controller 16 may include an internal clock or timer. Accordingly, the engine controller 16 is in electronic communication with the internal combustion engine 11.

The vehicle system 10 further includes a transmission controller 18 in electronic communication with the transmission 12. As such, the transmission controller 18 is programmed to control the operation of the transmission 12. The transmission 12 may include a transmission output speed sensor (TOSS) 19 configured to monitor and measure the rotational speed of the output shaft 20 of the transmission 12. The transmission controller 18 is programmed to determine (e.g., derive) and monitor the distance traveled to the vehicle system 10 as a function of the rotational speed of the output shaft 20 of the transmission 12. Alternatively, the distance traveled by the vehicle system 10 may be determined (e.g., derived) as a function of the rotational speed of a wheel of the vehicle system 10, which may be measured with a wheel speed sensor. The transmission controller 18 is programmed to generate a distance traveled signal DTS (i.e., a signal indicative of the distance traveled by the vehicle system 10) and communicate the distance travelled signal DTS to the engine controller 16.

The vehicle system 10 further includes a fuel level sensor 22 coupled to the fuel tank 14. As such, the fuel level sensor 22 is configured to measure the amount (e.g., level) of fuel F in the fuel tank 14. The fuel level sensor 22 may include a potentiometer and generates an unfiltered fuel level signal UFS that is indicative of the level (e.g., amount) of fuel F in the fuel tank 14. For example, the unfiltered fuel level signal UFS may indicate that there is 20 percent of the interior volume of the fuel tank 14 is filled with fuel F. The fuel level sensor 22 communicates the unfiltered fuel level signal UFS to the engine controller 16.

The engine controller 16 is programmed to determine (e.g., calculate) and monitor the fuel economy of the vehicle system 10 as a function of the fuel consumed by the vehicle system 10 and the distanced travelled by the vehicle system 10. The term "fuel economy" means a ratio of the fuel consumed by the vehicle system 10 to the distance travelled by the vehicle system 10 and may be expressed, for example, in miles per gallon. The fuel consumed by the vehicle system 10 may be determined based on the unfiltered fuel level signal UFS received from the fuel level sensor 22. The distance traveled by the vehicle system 10 may be determined based on the distance travelled signal DTS received from the TOSS 19. To determine (e.g., calculate) the fuel economy of the vehicle system 10, the engine controller 16 divides the fuel consumed by the vehicle system 10 (as determined based on the unfiltered fuel level signal UFS received from the fuel level sensor 22) by the distance travelled by the vehicle system 10 (as determined, for example, based on the distance travelled signal DTS received form the TOSS 19).

The vehicle system 10 further includes an instrument panel controller 34 in electronic communication with the engine controller 16. Accordingly, the engine controller 16 is programmed to send and receive data from the instrument panel controller 34. Likewise, the instrument panel controller 34 is programmed to send and receive data from the engine controller 16. The vehicle system 10 further includes an instrument panel 24. The instrument panel controller 34 is programmed to control the operation of the instrument panel 24. The instrument panel 24 includes a fuel gauge 26 and a low-fuel warning indicator 32. The fuel gauge 26 may also be referred to as a fuel level display gauge. In the present disclosure, the low-fuel warning indicator 32 includes a lamp that turns on and off. The instrument panel controller 34 is programmed to command the low-fuel warning indicator 32 to activate or deactivate the low-fuel warning indicator 32. Stated differently, the instrument panel controller 34 is programmed to command the low-fuel warning indicator 32 (e.g., lamp) to turn on or off. The instrument panel controller 34 is programmed to activate the low-fuel warning indicator 32 in response to determining that the fuel level in the fuel tank 14 is equal to or less than a low-fuel warning threshold. As discussed below, the engine controller 16 may change the low-fuel warning threshold between a first warning threshold and a second warning threshold. The second warning threshold is greater than the first warning threshold. For example, the first warning threshold may be that eleven percent of the fuel tank 14 is filled with fuel F, whereas the second warning threshold may be that fifteen percent of the fuel tank 14 is filled with fuel F. The instrument panel controller 34 receives the updated low-fuel warning threshold from the engine controller 16 and controls the operation of the low-fuel warning indicator 32 accordingly.

The instrument panel controller 34 is also programmed to control the operation of the fuel gauge 26. In one example, the fuel gauge 26 includes fuel level indicia 30 and a needle 28 that points toward the fuel level indicia 30 that corresponds to the fuel level in the fuel tank 14. For example, the fuel level indicia 30 may include F (for indicating that the fuel tank 14 is full), E (for indicating that the fuel tank 14 is empty), ¾ (for indicating that the fuel tank 14 is ¾ full), ½ (for indicating that the fuel tank 14 is half full), and ¼ (for indicating that the fuel tank 14 is ¼ full).

The engine controller 16 includes a display filter 36 to filter the unfiltered fuel level signal UFS received from the fuel level sensor 22. The noun "filter" means a device (e.g., circuit) or a process that removes some unwanted components or features from a signal. The display filter 36 smoothes the unfiltered fuel level signal UFS received from the fuel level sensor 22 of the vehicle system 10, thereby generating a filtered fuel level signal FFS. The filtered fuel level signal may be referred to as the normal fuel filtered signal. As a result, jiggle in the needle 28 of the fuel gauge 26 is minimized. In the present disclosure, the term "display filter" means a filter that smoothes the unfiltered fuel level signal UFS generated by the fuel level sensor 22 to smooth the fuel level displayed on the fuel level gauge 26, thereby minimizing jiggle in the needle 28 of the fuel gauge 26. As non-limiting examples, the display filter 36 may include a Savitzky-Golay filter, a Kalman filter, a limiting filter, a median filter, an arithmetic average filter, a recursive average filter, a limiting average filter, first order lag filter, among others. As discussed below, engine controller 16 is programmed to adjust the sensitivity of the display filter 36 based on the fuel economy. Specifically, the engine controller 16 is programmed to decrease the sensitivity of the display filter 36 in response to determining that the fuel economy of the vehicle system 10 is less than a predetermined fuel economy threshold for a predetermined amount of time in order to maximize the accuracy of the fuel level gauge 26. If the sensitivity of the display filter 36 is decreased, then the accuracy of the fuel level gauge 26 increases, but the smoothness of the filtered fuel level signal FFS decreases. If the sensitivity of the display filter 36 is increased, then the smoothness of the filtered fuel level signal FFS increases, but accuracy of the fuel level gauge 26 decreases. The sensitivity of the display filter 36 may be adjusted in different ways. For example, if the display filter 36 is an arithmetic average filter, then a number N of samples are taken successively and an arithmetic mean operation is performed on those samples. To adjust the sensitivity of the display filter 36 (in the case that it is an arithmetic average filter), the number N of samples taken may be adjusted. The larger number N of samples will result in greater signal smoothening, but lower sensitivity of the display filter 36. Conversely, lower number N of samples will result in less sensitivity of the display filter 36, but greater signal smoothening. After adjusting the sensitivity of the display filter 36, the engine controller 16 generates an updated filtered fuel level signal UFFS. The updated filter fuel level signal is then communicated to the instrument panel controller 34.

With reference to FIGS. 2A and 2B, the present disclosure describes an algorithm (i.e., method 100) which monitors the fuel economy of the engine and which, when that economy drops below a calibrated level for a calibrated time, with hysteresis, will adjust the display filter sensitivity, display filter lag and low fuel warning threshold. This algorithm will allow the low fuel warning lamp 32 to come on sooner than the existing state of the art in order to give the driver more time to find a refuel station based on current engine fuel consumption.

Existing fuel level display algorithms filter the display so that the needle on the gauge does not move around as fuel sloshes around in the tank, e.g. during braking and corning of the vehicle. These filters are "heavy" in order to show as little motion due to sloshing as possible. The nature of a heavy lag filter (or first order filter) is that there is a time delay or lag, between the real level of fuel in the tank and the displayed level. This delay, coupled with a smaller tank and an engine that is less efficient than normal due to heavy load (e.g., pulling a trailer) can lead to the fuel level becoming very low before the gauge indicates that fuel is about to run out. The presently disclosed algorithm will constantly monitor the fuel economy and dynamically adjust the filter, lag and warning threshold in order to give the proper advanced warning of fuel run out.

With continued reference to FIGS. 2A and 2B, the engine controller 16 and/or the instrument panel controller 34 are specifically programmed to execute the method 100. The method 100 begins at step 102, in which the method 100 starts. Then, the method 100 proceeds to step 104. At step 104, a manufacturer calibrator may turn the method 100 on or off (i.e., K_Heavy ConsumptionAdjustEnbl=True). Thus, certain vehicle systems 10 may have this method 100 enabled or disabled before the vehicle operator drives off a car dealership. If the manufacturer calibrator has not turned on this method 100, then the method 100 proceeds to step 106. At step 106, the method 100 ends (i.e., stops). On the other hand, if this method 100 has been enabled by the manufacturer calibrator, then the method 100 proceeds to step 108. At step 108, the engine controller 16 continuously monitors and determines (e.g., calculates) the fuel economy of the vehicle system 10. Fuel consumed will most likely be determined by fuel injector monitoring rather than, or in addition to, the fuel level sensor data. It is contemplated, however, that the fuel economy of the vehicle system 10 may be using the unfiltered fuel level signal UFS, For example, to determine (e.g., calculate) the fuel economy of the vehicle system 10, the engine controller 16 divides the fuel consumed by the vehicle system 10 (as determined based on the unfiltered fuel level signal UFS received from the fuel level sensor 22) by the distance travelled by the vehicle system 10 (as determined, for example, based on the distance travelled signal DTS received form the TOSS 19 or a wheel rotational speed sensor). The fuel economy of the vehicle system 10 may be expressed in miles per gallon (MPG). Thus, step 108 also includes continuously monitoring the fuel quantity consumed by the vehicle system 10 and continuously monitoring the distance travelled by the vehicle system 10.

At step 110, the engine controller 16 compares the fuel level in the fuel tank 14 (as determined using the filtered fuel level signal FFS) with a first predetermined fuel level threshold to determine whether the fuel level in the fuel tank 14 is less than the first predetermined fuel level threshold (i.e., NormalFiltFuelLevel<K_HeavyConsuptionHystLow?). As discussed above, the filtered fuel level signal FFS may be referred to as the normal filtered fuel level signal and be generated by the engine controller 16 before adjusting the sensitivity of the display filter 36. The normal filtered fuel level signal is indicative of the normal filtered fuel level value. The first predetermined fuel level threshold may be determined by through testing and calibration of the vehicle system 10. If the fuel level in the fuel tank 14 of the vehicle system 10 is greater than the first predetermined fuel economy threshold, then the method 100 proceeds to step 112. The first predetermined fuel economy threshold may be simply referred to as the predetermined fuel economy threshold.

At step 112, a timer, which is operated by the engine controller 16, is set to zero (i.e., the HeavyConsuptionMetTimer=0) to reinitialize the timer. Then, the method 100 proceeds to step 114. At step 114, the engine controller 16 compares the fuel level in the fuel tank 14 (as determined using the filtered level fuel signal FFS) with a second predetermined fuel level threshold to determine whether the fuel level in the fuel tank 14 is greater than the second predetermined fuel level threshold (i.e., NormFiltFuelLevel>K_HeavyConsumptionHystHigh?). The second predetermined fuel level threshold may be determined through testing and calibration and is greater than the first predetermined fuel level threshold. If the fuel level in the fuel tank 14 is less than the second predetermined fuel economy threshold, then the method 100 proceeds to step 106, in which the method 100 ends. If the fuel level in the fuel tank 14 is greater than the second predetermined fuel economy threshold, then the method 100 proceeds to step 122. At step 122, the engine controller 16 sets the Heavy Consumption Flag to False (i.e., HeavyConsumptionMetFlag=FALSE). The Heavy Consumption Flag is set to False by default. After step 122, the method 100 proceeds to step 134. At step 134, the timer is continuously counting time (i.e., Increment HeavyConsumptionTimer). Then, the method 100 proceeds to step 118. At step 118, the engine controller 16 sets the display filter 36 to its normal operation condition (i.e., DisplayFilter=K_NormalDispayFilter). The normal operation condition of the display filter 36 may be determined through testing and calibration of the vehicle system 10. Then, the method 100 proceeds to step 120. At step 120, the engine controller 16 sets the low-fuel warning threshold to the first warning threshold (i.e., LowFuelWarning=K_LOWTHRESHOLD). As discussed above, the first warning threshold is less than the second warning threshold. By default, the low-warning warning threshold is set to be the first warning threshold. The first warning threshold and the second warning threshold are determined through testing and calibration of the vehicle system 10.

At step 110, if the fuel level in the fuel tank 14 (as determined using the filtered fuel level signal FFS) is less than the first predetermined fuel level predetermined threshold, then the method 100 proceeds to step 124. As discussed above, the filtered fuel level signal FFS may be referred to as the normal filtered fuel level signal and is generated by the engine controller 16 before adjusting the sensitivity of the display filter 36. At step 124, the engine controller 16 compares the fuel economy of the vehicle system 10 with a predetermined fuel economy threshold to determine whether the fuel economy of the vehicle 10 is less than the predetermined fuel economy threshold (i.e, MPG>K_MPGThreshold?). The predetermined fuel economy threshold may be determined through testing and calibration of the vehicle system 10. If the fuel economy is less than the predetermined fuel economy threshold, then the method 100 proceeds to step 126.

At step 126, the engine controller 16 sets the timer to zero (i.e., HeavyConumptionMetTimer=0) to reinitialize the timer. Then, the method 100 proceeds to step 128. At step 128, the engine controller 16 sets the Remove Lag Flag to True (i.e., RemoveLagFlag=TRUE). The Remove Lag Flag is set to True by default, and it indicates to the engine controller 16 that the lag (i.e., delay) of the display filter 36 has to be removed. Next, the method 100 proceeds to step 130. At step 130, the engine controller 16 sets the Heavy Consumption Flag to False (i.e., HeavyConsumptionMetFlag=FALSE). After step 130, the method 10 proceeds to step 118.

If the fuel economy is less than the predetermined fuel economy threshold, then the method 100 proceeds to step 132. At step 132, the engine controller 16 compares the time lapsed since the fuel economy of the vehicle system 10 is less than the predetermined fuel economy threshold (as measured through the timer) with a predetermined amount of time (HeavyConsumptionMetTimer>K_HeavyConsumptionTime?). The predetermined amount of time may be determined through testing and calibration of the vehicle system 10. If the time lapsed since the fuel economy of the vehicle system 10 is less than the predetermined fuel economy threshold is less than the predetermined amount of time, then the method 100 proceeds to step 134. At step 134, the timer is continuously counting time (i.e., Increment HeavyConsumption-Timer). If the time lapsed since the fuel economy of the vehicle system 10 is less than the predetermined fuel economy threshold is greater than the predetermined amount of time, then the method 100 proceeds to step 136.

At step 136, the engine controller 16 sets the Heavy Consumption Flag is set to True (i.e., HeavyConsupmtionMetFlag=TRUE). In other words, at step 136, the engine controller 16 determines that the vehicle system 10 is operating in a heavy fuel consumption mode in response to determining that the fuel economy is less than the predetermined fuel economy threshold for the predetermined amount of time. Then, the method 100 proceeds to step 138. At step 138, the engine controller 16 determines whether the Remove Lag Flag is set to True or False (i.e., Remove LagFlag=TRUE?). If the Remove Lag Flag is set to False, then the method 100 proceeds to step 140. At step 140, the engine controller 16 adjusts the sensitivity of the display filter 24 in response to determining that the fuel economy is less than the predetermined fuel economy threshold for a predetermined amount of time in order to maximize the accuracy of the fuel level gauge 26 (i.e., DisplayFilter=K_LightDisplayFilter). Specifically, at step 140, the engine controller 16 decreases the sensitivity of the display filter 36 from a first sensitivity to a second sensitivity, wherein the second sensitivity is less than the first sensitivity to increase the accuracy of the fuel gauge 26. The first sensitivity and the second sensitivity of the display filter 36 may be determined through testing and calibration. At this stage, the display filter 36 generates an updated filtered fuel level signal UFS that takes into account the second sensitivity. Then, the method 100 proceeds to step 142.

At step 142, the engine controller 16 adjusts the low-fuel warning threshold in response to determining that the fuel economy is less than the predetermined fuel economy (i.e., LowFuelWarning=K_HIGHTHRESHOLD). Specifically, at step 142, the engine controller 16 changes the low-fuel warning threshold from a first warning threshold to a second warning threshold, wherein the second warning threshold is greater than the first warning threshold to provide an earlier indication to the vehicle operator that s/he is about to run out of fuel F. Also at step 142, the engine controller 16 communicates appropriate data (e.g., the updated fuel level filtered signal UFFS) to the instrument panel controller 34. Then, the instrument panel controller 34 controls the fuel display gauge 26 of the vehicle system 10 to display the fuel level of the vehicle system 10 that corresponds to the updated filtered fuel level signal UFFS) after adjusting the sensitivity of the display filter 36 and after possibly removing the lag from the display filter 36.

At step 138, if the Remove Lag Flag is set to True (i.e., RemoveLagFlag=TRUE?), then the method 100 proceeds to step 144. At step 144, the engine controller 16 sets the Remove Lag Flag to False (i.e., RemoveLagFlag=FALSE). Then, the method 100 proceed to step 146. At step 146, the engine controller 16 removes the lag (i.e., delay) of the display filter 36 by, for example, reinitializing the display filter 36 in response to determining that the fuel economy is less than the predetermined fuel economy for the predetermined amount of time to minimize the temporal delay between the unfiltered fuel level signal FFS and the updated filtered fuel level signal UFFS. Then, the method 100 proceeds to step 140 as discussed above.

While the best modes for carrying out the teachings have been described in detail, those familiar with the art to which this disclosure relates will recognize various alternative designs and embodiments for practicing the teachings within the scope of the appended claims. The vehicle system 10 and method 100 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. A method for controlling a fuel level gauge of a vehicle system, comprising:
   receiving, by an engine controller of the vehicle system, an unfiltered fuel level signal from a fuel level sensor in a fuel tank of the vehicle system;
   generating, using a display filter of the engine controller, a normal filtered fuel level signal to determine a fuel level in the fuel tank of the vehicle system;
   comparing, via the engine controller of the vehicle system, the fuel level in the fuel tank of the vehicle system as determined using the normal filtered fuel level signal with a predetermined fuel level threshold to determine that the fuel level in the fuel tank is less than the predetermined fuel level threshold;

monitoring, via the engine controller, a fuel economy of the vehicle system;

in response to determining that the fuel level in the fuel tank is less than the predetermined fuel level threshold, comparing, via the engine controller, the fuel economy with a predetermined fuel economy threshold to determine whether the fuel economy is less than the predetermined fuel economy threshold;

adjusting, via the engine controller, a sensitivity of a display filter in response to determining that the fuel economy is less than the predetermined fuel economy threshold for a predetermined amount of time in order to maximize an accuracy of the fuel level gauge, wherein the engine controller is programmed with the display filter to filter the unfiltered fuel level signal received from the fuel level sensor of the vehicle system to at least generate the normal filtered fuel level signal, wherein adjusting the sensitivity of the display filter includes decreasing the sensitivity of the display filter from a first sensitivity to a second sensitivity after determining that the fuel economy is less than the predetermined fuel economy threshold for the predetermined amount of time to maximize the accuracy of a fuel gauge of the vehicle system, the second sensitivity is less than the first sensitivity;

generating, using the display filter, an updated filtered fuel level signal using the second sensitivity after adjusting the sensitivity of the display filter, wherein the display filter generates the updated filtered fuel level signal by filtering the unfiltered fuel level signal using the second sensitivity;

controlling, via an instrument panel controller, the fuel level gauge of the vehicle system to display the fuel level in the fuel tank of the vehicle system corresponding to the updated filtered fuel level signal after adjusting the sensitivity of the display filter;

starting a timer in response to determining that the fuel economy of the vehicle system is less than the predetermined fuel economy threshold to measure an amount of time that has lapsed since the fuel economy of the vehicle system is less than the predetermined fuel economy threshold; and removing, via the engine controller, a lag from the display filter in response to determining that the fuel economy is less than the predetermined fuel economy threshold for the predetermined amount of time to minimize a temporal delay between the unfiltered fuel level signal and the normal filtered fuel level signal, wherein removing the lag from the display filter occurs by reinitializing the display filter.

2. The method of claim 1, further comprising adjusting, via the engine controller, a low-fuel warning threshold in response to determining that the fuel economy is less than the predetermined fuel economy threshold, wherein the instrument panel controller is programmed to activate a low-fuel warning indicator in response to determining that the fuel level of the vehicle system is equal to or less than the low-fuel warning threshold, and adjusting the low-fuel warning threshold includes changing the low-fuel warning threshold from a first warning threshold to a second warning threshold, and the second warning threshold is greater than the first warning threshold.

3. The method of claim 2, wherein monitoring the fuel economy of the vehicle system includes:

monitoring a distance traveled by the vehicle system;

monitoring a fuel quantity consumed by the vehicle system; and dividing the distance traveled by the vehicle system by the fuel quantity consumed by the vehicle system to continuously determine the fuel economy of the vehicle system.

4. The method of claim 3, wherein the normal filtered fuel level signal is indicative of a normal filtered fuel level value.

5. The method of claim 4, further comprising comparing the normal filtered fuel level value with a first predetermined fuel level threshold to determine whether the normal filtered fuel level value is greater than the first predetermined fuel level threshold; and wherein comparing the fuel economy of the vehicle system with the predetermined fuel economy threshold occurs in response to determining that the normal filtered fuel level value is greater than the first predetermined fuel level threshold.

6. The method of claim 5, further comprising:

after starting the timer, comparing the amount of time that has lapsed since the fuel economy of the vehicle system is less than the predetermined fuel economy threshold with the predetermined amount of time to determine whether the amount of time that has lapsed since the fuel economy of the vehicle system is less than the predetermined fuel economy threshold is greater than the predetermined amount of time;

determining that the vehicle system is operating in a heavy fuel consumption mode in response to determining that the fuel economy is less than the predetermined fuel economy threshold for the predetermined amount of time;

setting a remove lag flag to FALSE; and wherein removing the lag from the display filter occurs in response after setting the remove lag flag to FALSE.

7. The method of claim 6, wherein adjusting the sensitivity of the display filter based on the fuel economy occurs after removing the lag from the display filter.

8. The method of claim 7, wherein adjusting the low-fuel warning threshold occurs after adjusting the sensitivity of the display filter.

9. A vehicle system, comprising:

an internal combustion engine;

an engine controller in communication with the internal combustion engine, the engine controller being programmed with a display filter;

a fuel tank in fluid communication with the internal combustion engine;

a fuel level sensor configured to measure and monitor a fuel level inside the fuel tank;

an instrument panel controller in communication with the engine controller; and an instrument panel in communication with the instrument panel controller, wherein the instrument panel includes a fuel level gauge;

wherein the engine controller is programmed to:

receive an unfiltered fuel level signal from the fuel level sensor;

generate, using the display filter, a normal filtered fuel level signal to determine the fuel level in the fuel tank;

compare the fuel level in the fuel tank as determined using the normal filtered fuel level signal with a predetermined fuel level threshold to determine that the fuel level in the fuel tank is less than the predetermined fuel level threshold;

monitor a fuel economy of the vehicle system;

in response to determining that the fuel level in the fuel tank is less than the predetermined fuel level threshold, compare the fuel economy with a predetermined fuel economy threshold to determine whether the fuel economy is less than the predetermined fuel economy threshold;

adjust a sensitivity of a display filter based on the fuel economy in response to determining that the fuel economy is less than the predetermined fuel economy threshold for a predetermined amount of time in order to maximize an accuracy of the fuel level gauge, wherein the display filter is configured to filter the unfiltered fuel level signal received from the fuel level sensor to at least generate the normal filtered fuel level signal, wherein adjusting the sensitivity of the display filter includes decreasing the sensitivity of the display filter from a first sensitivity to a second sensitivity after determining that the fuel economy is less than the predetermined fuel economy threshold for the predetermined amount of time to maximize the accuracy of the fuel level gauge of the vehicle system;

generate, using the display filter, an updated filtered fuel level signal using the second sensitivity after adjusting the sensitivity of the display filter, wherein the display filter generates the updated filtered fuel level signal by filtering the unfiltered fuel level signal using the second sensitivity; and wherein the instrument panel controller is programmed to:
control the fuel level gauge of the vehicle system to display the fuel level of the vehicle system corresponding to the updated filtered fuel level signal after adjusting the sensitivity of the display filter;

start a timer in response to determining that the fuel economy of the vehicle system is less than the predetermined fuel economy threshold to measure an amount of time that has lapsed since the fuel economy of the vehicle system is less than the predetermined fuel economy threshold; and remove a lag from the display filter in response to determining that the fuel economy is less than the predetermined fuel economy threshold for the predetermined amount of time to minimize a temporal delay between the unfiltered fuel level signal and the normal filtered fuel level signal, wherein the lag is removed from the display filter by reinitializing the display filter.

10. The vehicle system of claim 9, wherein the engine controller is further programmed to adjust a low-fuel warning threshold in response to determining that the fuel economy is less than the predetermined fuel economy threshold, wherein the instrument panel controller is programmed to activate a low-fuel warning indicator in response to determining that the fuel level of the vehicle system is equal to or less than the low-fuel warning threshold.

11. The vehicle system of claim 10, wherein the engine controller monitors the fuel economy of the vehicle system by:
monitoring a distance traveled by the vehicle system;
monitoring a fuel quantity consumed by the vehicle system; and
dividing the distance traveled by the vehicle system by the fuel quantity consumed by the vehicle system to continuously determine the fuel economy of the vehicle system.

12. The vehicle system of claim 11, the normal filtered fuel level signal is indicative of a normal filtered fuel level value.

13. The vehicle system of claim 12, wherein the engine controller is further programmed to compare the normal filtered fuel level value with a first predetermined fuel level threshold to determine whether the normal filtered fuel level value is greater than the first predetermined fuel level threshold; and
wherein comparing the fuel economy of the vehicle system with the predetermined fuel economy threshold occurs in response to determining that the normal filtered fuel level value is greater than the first predetermined fuel level threshold.

14. The vehicle system of claim 12, wherein the engine controller is further programmed to:
after starting the timer, compare the amount of time that has lapsed since the fuel economy of the vehicle system is less than the predetermined fuel economy threshold with the predetermined amount of time to determine whether the amount of time that has lapsed since the fuel economy of the vehicle system is less than the predetermined fuel economy threshold is greater than the predetermined amount of time; and
determine that the vehicle system is operating in a heavy fuel consumption mode in response to determining that the fuel economy is less than the predetermined fuel economy threshold for the predetermined amount of time;
set a remove lag flag to FALSE; and
wherein removing the lag from the display filter occurs in response after setting the remove lag flag to FALSE.

15. The vehicle system of claim 14, wherein the engine controller adjusts the sensitivity of the display filter based on the fuel economy after removing the lag from the display filter.

16. The vehicle system of claim 15, wherein the engine controller is programmed to adjust the low-fuel warning threshold occurs after adjusting the sensitivity of the display filter.

\* \* \* \* \*